(12) United States Patent
Peck

(10) Patent No.: US 7,364,120 B2
(45) Date of Patent: Apr. 29, 2008

(54) QUANTIZED CONTROL-MOMENT GYROSCOPE ARRAY

(75) Inventor: Mason A. Peck, Ithaca, NY (US)

(73) Assignee: Honeywell International, Inc., Morristown, NJ (US)

( * ) Notice: Subject to any disclaimer, the term of this patent is extended or adjusted under 35 U.S.C. 154(b) by 517 days.

(21) Appl. No.: 10/928,677

(22) Filed: Aug. 26, 2004

(65) Prior Publication Data
US 2006/0049314 A1 Mar. 9, 2006

(51) Int. Cl.
*B64G 1/28* (2006.01)
(52) U.S. Cl. .................... 244/165; 244/171.5
(58) Field of Classification Search ............... 244/165, 244/171.5, 164, 170
See application file for complete search history.

(56) References Cited

U.S. PATENT DOCUMENTS

| | | | |
|---|---|---|---|
| 5,692,707 A * | 12/1997 | Smay | 244/165 |
| 6,039,290 A | 3/2000 | Wie et al. | |
| 6,131,056 A | 10/2000 | Bailey et al. | |
| 6,305,647 B1 * | 10/2001 | Defendini et al. | 244/165 |
| 6,499,699 B1 * | 12/2002 | Salenc et al. | 244/165 |

FOREIGN PATENT DOCUMENTS

| | | |
|---|---|---|
| EP | 1 002 716 | 5/2000 |
| FR | 2 796 172 | 1/2001 |
| FR | 2 850 948 | 8/2004 |

OTHER PUBLICATIONS

PCT International Search Report PCT/US2005/030460, Dec. 4, 2006.
V. Lappas, Dr. WH Steyn, Dr. Ci Underwood; Attitude Control For Small Satellites Using Control Moment Gyros, Acta Astronautica, Jul. 2002.

* cited by examiner

*Primary Examiner*—J. Woodrow Eldred
(74) *Attorney, Agent, or Firm*—Ingrassia Fisher & Lorenz

(57) ABSTRACT

A momentum actuator for steering a spacecraft is disclosed. The momentum actuator comprises a rotor, a gimbal upon which the rotor is mounted, and a stepper motor coupled to the gimbal and operable to rotate the rotor about the gimbal in a series of steps. In one embodiment of the present invention the spin rate of the rotor can be varied to provide torque.

7 Claims, 4 Drawing Sheets

QUANTIZED CONTROL-MOMENT GYROSCOPE ARRAY

TECHNICAL FIELD

This invention relates to the field of spacecraft vehicle control and, more specifically, to a quantized control-moment gyroscope array.

BACKGROUND

Satellites and spacecraft typically require attitude adjustments. For example, an attitude adjustment of a satellite may be necessary in order to change the direction of where a telescope mounted on the satellite points. In one embodiment, attitude adjustment of a satellite or spacecraft can be done through the use of momentum actuators mounted within the satellite.

One type of momentum actuator is a reaction wheel. The reaction wheel comprises a variable-speed rotor. Varying the spin rate of the rotor changes its angular momentum. The change in angular momentum of the reaction wheel produces an opposite change of the angular momentum of the satellite body. Typically, at least three reaction wheels are needed to provide the ability to change the three-dimensional angular momentum of a spacecraft.

Another type of momentum actuator is a control-moment gyroscope (CMG). A CMG comprises a rotating fixed or variable-speed rotor attached to a gimbal assembly. Tilting the gimbal assembly, changing the wheel speed or both changes in the CMG's angular momentum in the spacecraft-fixed frame. Like reaction wheels, at least three CMGs must be used in order to change the three-dimensional angular momentum of a spacecraft.

While current momentum actuators provide an efficient way to adjust the attitude of a spacecraft, they have drawbacks, especially with regard to their use in satellites smaller than a few hundred kilograms. For example, a typical CMG requires a high-precision motor to move the gimbal assembly and rotor. Additionally, various high-resolution sensors are used to measure the gimbal angle of the CMG. Precision and resolution are more difficult and expensive to achieve in smaller packages. Furthermore, a smaller satellite likely demands higher-bandwidth control, which represents an additional burden on the bandwidth of the CMGs and their components. What is needed is a high-torque momentum actuator appropriate for use in small satellites, where not only are the design implications of scaling a large-CMG design prohibitive but where cost also must be considerably lower than that of their larger counterparts.

SUMMARY OF THE INVENTION

In one embodiment of the present invention a momentum actuator for steering a spacecraft is disclosed. The momentum actuator comprises a rotor, a gimbal upon which the rotor is mounted, and a stepper motor coupled to the gimbal and operable to rotate the rotor about the gimbal in a series of steps. In one embodiment of the present invention the spin rate of the rotor can be varied to provide torque.

In another aspect of the present invention a method for steering CMGs having variable speed rotors and moveable gimbals is provide. In this method, the gimbals move in discrete steps. In a first step a change in momentum needed to make a desired attitude change for a spacecraft is determined. Next, only the rotor's spin rate is adjusted if the change in momentum does not require the gimbals to be moved. If the needed momentum is more than can be provided with adjusting the spin rate of +the rotor, then, in a third step, the gimbals are stepped to a new alignment if needed to provide at least part of the needed change in momentum.

In yet another aspect of the present invention, a table referencing all points in momentum space achievable by all possible alignments of the CMGs is generated. In addition, in one embodiment of the present invention, the table does not contain any alignments of the CMGs that can result in a singular condition.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
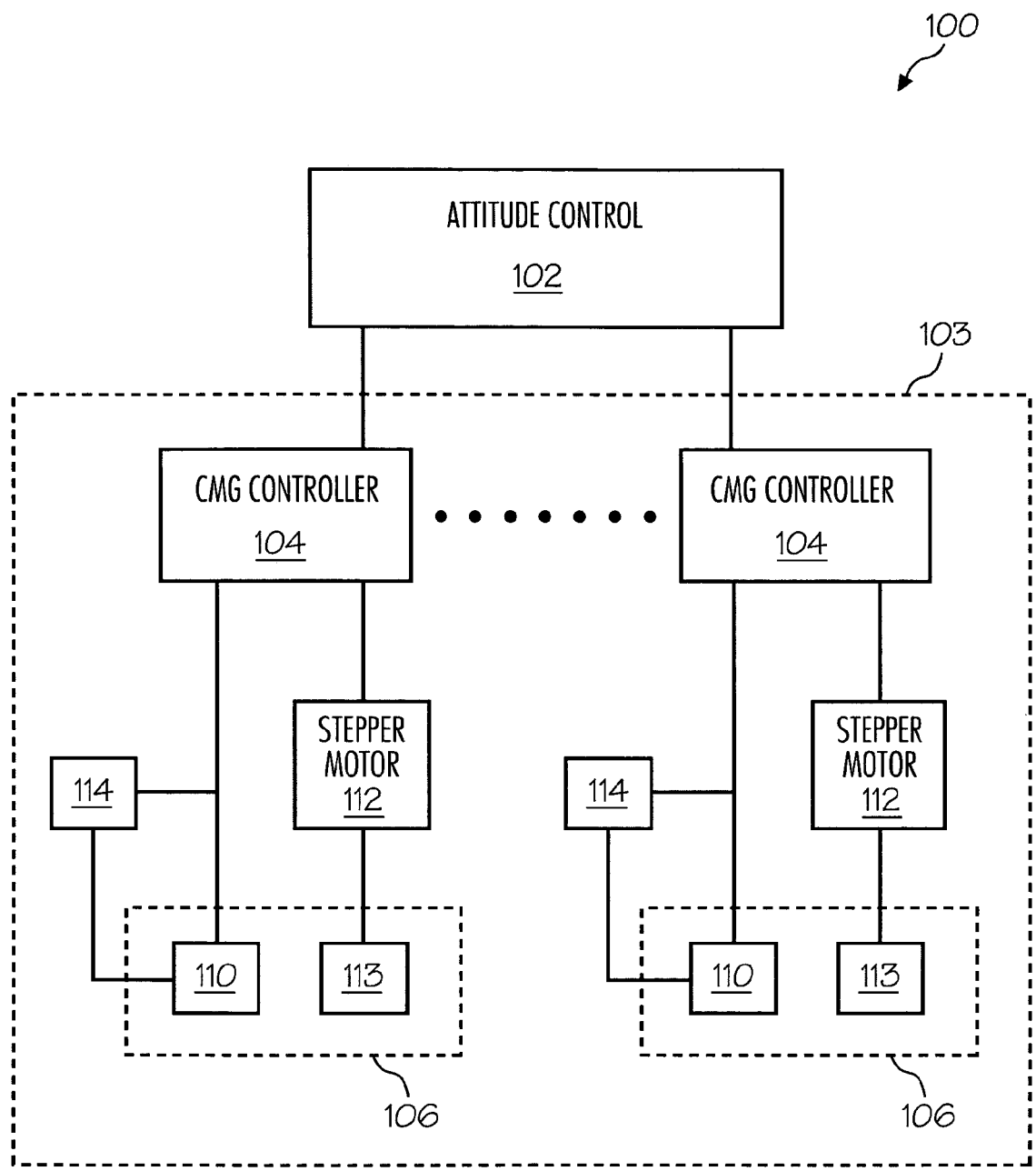
FIG. 1 is a block diagram of a momentum actuator in accordance with the teachings of the present invention.

FIG. 1 illustrates an exemplary momentum control system 100 in accordance with the teachings of the present invention. The momentum control system 100 includes an attitude control system 102 coupled to a CMG array 103. The CMG array 103 comprises one or more control momentum gyros 106 coupled to the attitude control system 102 via a CMG controller 104.

The attitude control system 102 controls the positioning of a spacecraft. The attitude control system 102 receives data concerning a desired spacecraft maneuver and determines the appropriate torque and/or momentum command to complete the desired maneuver. The commands are presented to the CMG controller 104, which determines the movement of the CMGs 106 needed to provide the needed torque.

Each CMG comprises a rotor 110 coupled to a gimbal 113. In the present invention the gimbal of each CMG 106 is capable of moving the rotor about the gimbal axis to provide torque. In addition, in an embodiment of the present invention, the spin rate of the rotor 110 of the CMG 106 can be varied to provide additional torque. Movement of the CMG 106 about its gimbal axis produces a torque orthogonal to the gimbal axis. Varying the spin rate of the rotor 110 produces torque in the direction of the spin axis of the rotor 110.

In one embodiment of the present invention, each of the CMGs 106 moves about their gimbal axis in a series of discrete steps with the angular spacing of the steps an order of magnitude or more greater than those of a traditional CMG, which is meant to approach smooth, continuous motion. For this reason, the CMG movement, in accordance with the teachings of the present invention, can be considered quantized. The number of steps chosen to divide the entire range of gimbal 113 movement depends, at least in part, by the responsiveness needed for the particular spacecraft. While in one embodiment of the present invention the rotor remains at a fixed speed, in effect quantizing the possible spacecraft momentum states, in another embodiment the rotor offers some minimal speed variability. In the variable-speed rotor embodiment, speed variations among the rotors of the CMGs are used to fill in momentum capability between the momentum quanta of which gimbal motion alone is capable.

The number of gimbal-angle steps therefore depends on the responsiveness of the rotor torque motor given the spacecraft requirements for attitude settling time. The choice of gimbal step angle also depends on the spacecraft jerk requirements: smaller steps induce less vibration in flexible and fluid components, which may be desirable in some cases. Larger steps may excite vibration but with the benefits of faster performance and steering algorithms that require less on-board processing capacity. Cost can be another factor. Stepper motors that offer 200 or fewer steps per revolution are relatively inexpensive. Incorporating finer stepping, a gearbox, or digitally controlled microstepping can add undesirable complexity and cost.

In one embodiment of the present invention, each of the CMGs 106 is moved about its gimbal axis by a stepper motor 112 coupled to gimbal 113. The stepper motor 112 can be any motor that provides for movement (such as rotation) in discrete steps rather than continuous movement. The current position of the CMG 106 with respect to the gimbal axis can be determined, in one embodiment, by keeping track of the number of steps made by the stepper motor 112. Thus, sensors used to determine gimbal axis movement, such as encoders and gimbal tachometers, as used in typical CMGs, are not needed. The elimination of sensors allows for a simpler, less expensive, more compact and lighter-weight design. The stepper motor 112 can be designed so that spacecraft rate-induced torque on the stepper motor 112 does not exceed the detent torque, so that no steps are lost. If losing steps is a risk, a one- or n-per-revolution synchronization mechanism, such as an optical detector, can be incorporated to correct the step count occasionally.

The rotor 110 of the CMG 106 can be, in one embodiment, coupled to a variable-speed motor 114. Varying the speed of the rotor 110 allows the CMG 106 to be used like a reaction wheel. While CMGs with variable speed rotors are known in the art, the implementation of CMGs with variable speed rotors, in accordance with the teachings of the present invention, is novel. Specifically, the movement of the rotor 110 can provide an extra amount of momentum change to in effect smooth out the coarse movement of another CMG 106 about its gimbal axis.

In one embodiment, the variable speed motor 114 is a brushless DC motor, which allows for very small percentage changes in the spin rate of the rotor 110 and, thus, very fine momentum adjustments. In this embodiment of the present invention, multiple CMG rotors 110 acting in concert are used to adjust the quantized, or coarse, three-dimensional angular momentum delivered by gimbal motion. No single CMG's rotor 110 can fill in momentum between the steps of its own gimbal axis because rotor-speed variation produces momentum change that is orthogonal to what the gimbals produce. For the same reason that three CMGs 106 are necessary to control three degrees of freedom of spacecraft orientation, three adjustable rotors 110 are necessary to fill in between the momentum quanta in this quantized CMG array 103. Furthermore, the risk of CMG output-torque axes becoming parallel (known as a singularity, where fewer than three degrees of freedom are controllable) is analogous to the CMG rotors 110 becoming parallel. If CMG rotors 110 become parallel, the CMG rotors 110 can no longer fill in between quanta three dimensionally. Instead, CMG rotors 110 can fill in within a plane or along a line. If necessary, singularity avoidance algorithms for the rotor momentum can be implemented.

The use of the stepper motor 112 in the present invention not only provides for discrete quantized movement of the CMG but, together with at least three CMGs in a CMG array, provides for a set of gimbal orientation values that correspond to a set of given momentum values. For example, for an array of n CMGs 106 with m steps per CMG gimbal 113, the momentum envelope is a collection of $m^n$ discrete points separated in momentum space by quanta of angular momentum that depend upon the gimbal angle. Therefore, a lookup table, a linked list using pointers, a hashing technique, or similar approach referencing all of the points in momentum space can be constructed. One advantage of such a lookup table is if there is a chance of a singular condition, that is, a chance that the alignment of the CMGs 106 in the CMG array 103 is such that the momentum vectors of the CMGs 106 lined up such that one or more components of the requested torque cannot be provided, those configurations can be omitted from the lookup table as illegal. This discretized representation of singularity avoidance is novel, computationally trivial compared to the continuous-motion case, and can be realized with the quantized array.

Depending on the desired spacecraft maneuver, a spacecraft may need to undergo a fast slew, which is a high-speed, low-precision maneuver; and/or a slow slew, which is a low-speed, high-precision maneuver.

Figure 2:
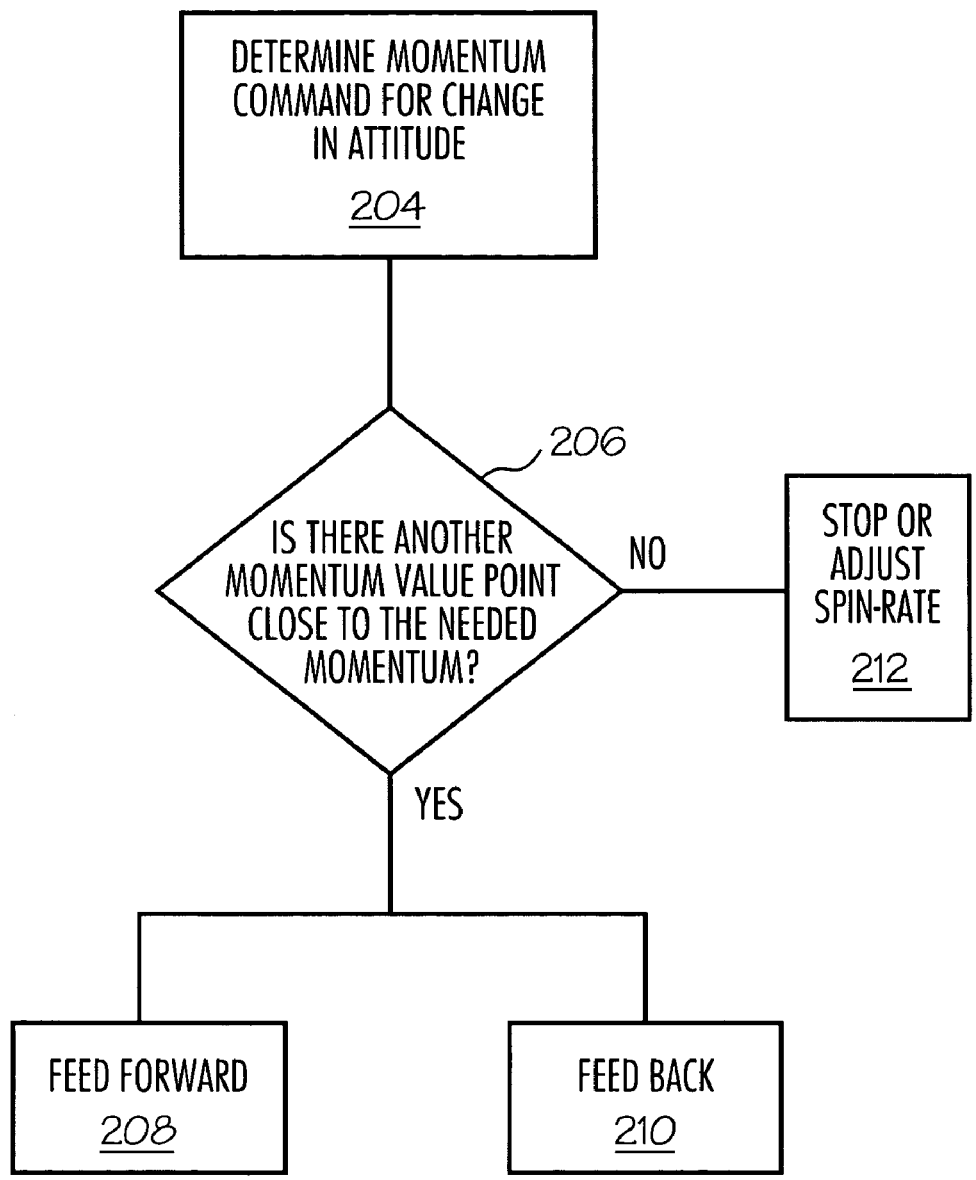
FIG. 2 is a flowchart illustrating one embodiment of a method of use of the present invention.
Figure 3:
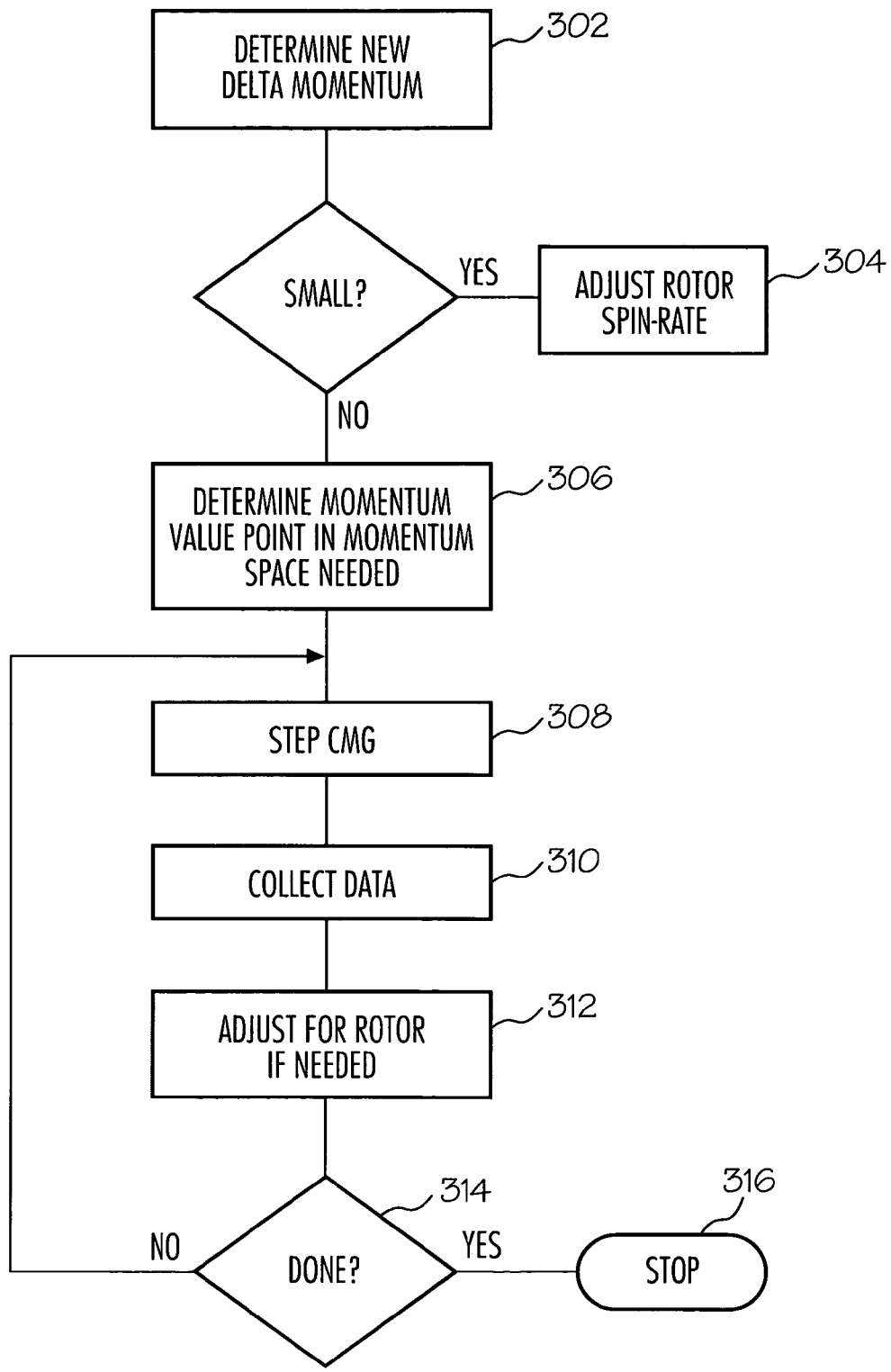
FIG. 3 is a flowchart illustrating another embodiment of a method of use of the present invention.

FIG. 2 is a flow chart illustrating a method for performing a fast slew in accordance with the teachings of the present invention. In a first step, step 202, a torque command sufficient to produce a desired maneuver is determined. In one embodiment of the present invention, the determined torque command is integrated to determine a desired command momentum.

Next, in step 204, each of the momentum points in the set of all momentum points based on the CMGs 106 in the CMG array 103 that surround the current momentum point are compared to the desired momentum state. This will determine if the CMG 106 needs to be moved to a new momentum point. In one embodiment, the momentum points can be provided as a lookup table, a linked list using pointers, a hashing technique, or the like which can be generated before the start of the method or at step 204.

If there is a momentum point that is closer to the commanded momentum, in step 206, each of the CMGs 106 in the CMG array 103 can be stepped to the proper gimbal angle step to reach that point. Since the gimbal angle movements are quantized, the new momentum point as determined in step 204, may not (and most likely do not) achieve the exact commanded momentum. To achieve the exact momentum, the rotor 110 of the CMG 106 can be adjusted. The movement of the CMG 106 and the adjustment of the rotor spin rate can be done in one of two ways. In a first embodiment (step 208), a feed-forward system can be used. In the feed-forward embodiment, as the CMGs 106 are being stepped, the spin rate of the rotor 110 of each CMG 106 can be varied to produce the needed change in angular momentum. In a second embodiment (step 210), a feedback system can be used. In the feedback system embodiment, after the CMGs 106 have been stepped to their new alignment, momentum is adjusted by adjusting the spin rate of the rotor 110 of each CMG 106. In either case, a low-bandwidth loop around the rotor speeds can be implemented to keep them close to the nominal values, allowing speed variation only to fill in between quanta rather than permit a secular trend.

If the current momentum point is closest to the desired new momentum value as determined in step 204, then the gimbal 113 of the CMG 106 does not need to be moved. Instead, the spin rate of the rotor 110 can be adjusted to achieve the desired momentum space (step 212).

The above method provides for fast slewing of a spacecraft. At times, low-speed, high-precision movements are needed, for example, to point a spacecraft at an object. For example, a telescope mounted on a satellite may need to be directed to a specific location to observe a particular astronomical event. In an embodiment of the present invention, in a first step 302, the change in angular momentum needed to make the attitude change is determined. Then, if only a small command torque or momentum is required, in step 304, the spin rate of the rotors 110 of the CMG 106 can be adjusted to provide the momentum needed.

If more momentum is required than the momentum available for only adjusting the spin rate of the CMGs' rotors 110, in a next step 306, the momentum point needed to provide the needed momentum is determined, similar to the method of FIG. 2. In one embodiment, the momentum points can be provided as a lookup table, a linked list using pointers, a hashing technique, or the like which can be generated before the start of the method or at step 306.

Next, in step 308, each of the CMGs 106 is stepped to a desired arrangement to achieve the momentum point. Once the CMGs 106 have completed their stepping motion, any data that needs to be captured is captured (step 310). This data-capture event is unrelated to the operation of the CMGs 106 but is described to put the method in a larger context. Depending on the spacecraft's payload, data may be taken during stepping. Then the rotors 110 of the CMGs 106 are adjusted to provide any additional momentum needed (step 312). If the desired momentum point is reached, movement stops in step 316. If the desired momentum point is not reached, then the process continues at step 308. In this embodiment, data collection is avoided during the stepping of the CMG gimbal 113 when the stepping would introduce unwanted disturbances.

Figure 4:
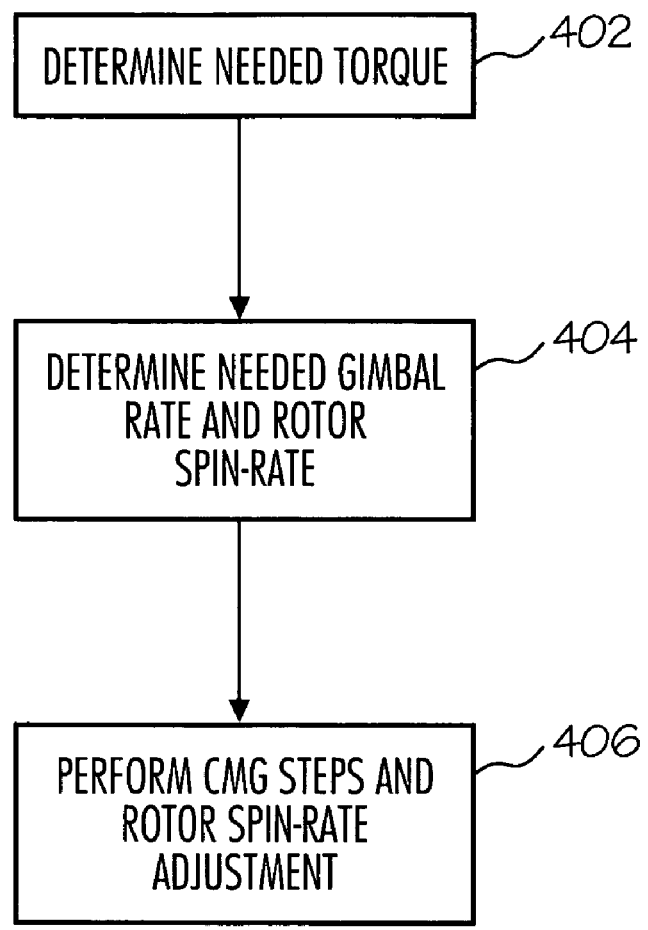
FIG. 4 is a flowchart illustrating another embodiment of a method of use of the present invention.

In another embodiment of the present invention, the stepping of each CMG 106 can be considered to be done at a gimbal rate expressed in terms of steps per second. In this approach, this effective gimbal rate rather than discretized positioning is used in a traditional CMG-commanding scheme. In addition, the rotor 110 of each of the CMGs 106 can be varied to provide additional torque. FIG. 4 is a flowchart illustrating the simultaneous rate-like control of stepping of the CMG 106 and the control of CMGs rotor 110. In a first step, step 402, a command torque needed to produce a desired attitude adjustment is determined. Next, in step 404, a combination of the gimbal rate produced by moving each of the CMGs 106 a number of steps in a given period and the torque provided by adjusting the spin rate of the rotor 110 of each of the CMGs 106 that is needed to produce the required torque is determined. In one embodiment, a weighting factor can be used to emphasize either the stepping of the CMGs 106 or the adjustment of the spin rate of the CMGs' rotor 110. Typically, the greater the torque required the larger the weighting of the gimbal rate.

After the proper gimbal rate and change of spin rate of the CMGs rotor 110 is determined, in step 406, the rates are provided to the CMGs 106 in the CMG array 103 to perform the required steps of the gimbal and the required changes in the rotor spin rate.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method for steering control-moment gyroscopes having variable-speed rotors and moveable gimbals, the gimbals moving in discrete steps, the method comprising:
   generating a table referencing all momentum points in momentum space achievable by all possible alignments of the control-moment gyroscopes;
   determining a change in momentum needed to make a desired attitude change for a spacecraft;
   determining if the gimbals need to be stepped to provide at least part of the change in momentum;
   altering only a spin rate of the rotor if the change in momentum does not require the gimbals to be moved; and
   changing the alignment of the gimbals if needed to provide at least part of the change in momentum.

2. The method of claim 1 wherein the step of determining a change in momentum further comprises comparing each of the momentum points in the space of all momentum points achievable by an alignment of the control-moment gyroscopes that surround the current momentum point to determine if the control-moment gyroscope needs to be rotated.

3. A method for steering control-moment gyroscopes having variable-speed rotors and moveable gimbals, the gimbals moving in discrete steps, the method comprising:
   generating a table referencing all momentum points in momentum space achievable by all possible alignments of the control-moment gyroscopes, except any alignments of the control-moment gyroscopes that can result in a singular condition;
   determining a change in momentum needed to make a desired attitude change for a spacecraft;
   determining if the gimbals need to be stepped to provide at least part of the change in momentum;
   altering only a spin rate of the rotor if the change in momentum does not require the gimbals to be moved; and
   changing the alignment of the gimbals if needed to provide at least part of the change in momentum.

4. The method of claim 1 wherein the step of changing the alignment of the control-moment gyroscopes further comprises changing the spin rate of the rotor of the control-moment gyroscope after changing the alignment of the control-moment gyroscope to provide any additional momentum needed.

5. The method of claim 1 further comprising varying the spin rate of the rotors as the gimbals of the control-moment gyroscope are being moved.

6. The method of claim 1 wherein the step of changing the alignment of the control-moment gyroscopes further comprises;
  a) moving the control-moment gyroscopes to a new momentum point;
  b) changing the spin rate of the rotor:
  c) checking to determine if desired change in momentum has occurred; and
  d) repeating the steps of a-c if the desired momentum change is not finished.

7. The method of claim 6 further comprising the step of collecting data between the steps of moving the control-moment gyroscopes and changing the spin rate of the rotors.

* * * * *